(12) United States Patent
Muir et al.

(10) Patent No.: US 10,876,260 B2
(45) Date of Patent: Dec. 29, 2020

(54) ACCURATE TOOL DEPTH CONTROL

(71) Applicant: Caterpillar Paving Products Inc., Brooklyn Park, MN (US)

(72) Inventors: Jason W. Muir, Andover, MN (US); Nathaniel S. Doy, Maple Grove, MN (US); Lee M. Hogan, Champlin, MN (US); Matthew-David S. Frantz, Eden Prairie, MN (US); Brian J. Schlenker, Shoreview, MN (US); Derek P. Nieuwsma, Loretto, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 16/366,332

(22) Filed: Mar. 27, 2019

(65) Prior Publication Data

US 2020/0308783 A1 Oct. 1, 2020

(51) Int. Cl.
*E01C 23/088* (2006.01)
*E01C 23/12* (2006.01)
*E01C 23/06* (2006.01)

(52) U.S. Cl.
CPC .......... *E01C 23/088* (2013.01); *E01C 23/127* (2013.01); *E01C 23/065* (2013.01)

(58) Field of Classification Search
CPC .................................................. E01C 23/088
USPC .............................. 299/1.5, 39.6; 404/84.05
See application file for complete search history.

(56) References Cited

U.S. PATENT DOCUMENTS

| 6,152,648 | A | * | 11/2000 | Gfroerer | E01C 23/088 |
| | | | | | 299/1.5 |
| 6,293,562 | B1 | | 9/2001 | Kutscher | |
| 6,498,967 | B1 | | 12/2002 | Hopkins et al. | |
| 6,769,836 | B2 | | 8/2004 | Lloyd | |
| 7,946,788 | B2 | * | 5/2011 | Jurasz | E01C 23/127 |
| | | | | | 404/84.8 |
| 8,764,118 | B1 | | 7/2014 | Krishnamoorthy et al. | |
| 8,899,689 | B2 | * | 12/2014 | Killion | E01C 23/127 |
| | | | | | 299/1.5 |
| 9,038,289 | B2 | | 5/2015 | Kelly | |
| 9,057,161 | B2 | | 6/2015 | Berning et al. | |
| 9,605,393 | B2 | | 3/2017 | Schlenker et al. | |
| 9,879,391 | B2 | | 1/2018 | Berning et al. | |

(Continued)

FOREIGN PATENT DOCUMENTS

| CN | 102644232 | 8/2012 |
| CN | 205368983 | 7/2016 |

(Continued)

*Primary Examiner* — Sunil Singh

(74) *Attorney, Agent, or Firm* — Schwegman, Lundberg & Woessner

(57) ABSTRACT

An implement with a ground-engaging tool may include a frame supported above a surface of a ground by a ground-engaging portion and a suspension and a tool supported by and adjustable relative to the frame and configured for working the ground. The implement may also include a plurality of ground sensors configured for capturing distance measurements to determine the position of the frame relative to the surface and a control and monitor system configured for establishing a nominal scratch position of the tool relative to the surface based on the distance measurements. A method of controlling a rotor tool depth of a milling machine and a method of operating a milling machine are also described.

20 Claims, 10 Drawing Sheets

(56) References Cited

U.S. PATENT DOCUMENTS

| | | |
|---|---|---|
| 9,970,164 B2 | 5/2018 | Fritz et al. |
| 2002/0047301 A1 | 4/2002 | Davis |
| 2008/0153402 A1 | 6/2008 | Arcona et al. |
| 2016/0326701 A1 | 11/2016 | Schlenker et al. |
| 2017/0362784 A1 | 12/2017 | Hoffmann et al. |
| 2018/0058020 A1 | 3/2018 | Berning et al. |
| 2018/0340302 A1 | 11/2018 | Menzenbach et al. |

FOREIGN PATENT DOCUMENTS

| | | |
|---|---|---|
| CN | 107881883 | 4/2018 |
| CN | 108004894 | 5/2018 |
| CN | 207392004 | 5/2018 |
| EP | 0547378 | 6/1993 |

\* cited by examiner

ACCURATE TOOL DEPTH CONTROL

TECHNICAL FIELD

The present disclosure relates to establishing a reference point for a ground engaging tool of a machine or implement. More particularly, the present disclosure relates to establishing a ground-engaging reference point for the ground-engaging tool. Still more particularly, the present disclosure relates to establishing a ground-engaging reference point for a rotor of a rotary mixer.

BACKGROUND

Various machines or implements may include ground engaging tools for interacting, treating, or modifying the ground as the machine or implement travels. Such machines or implements may include plows, planters, or fertilizing equipment in the agricultural industry. In the construction industry, such machines or equipment may include earth movers or cold planers, rotary mixers, or other milling machines, for example. Still other examples may include grooming equipment for various situations.

The position of the ground-engaging tool relative to the ground can be important for an operator to know and monitor for several reasons. For purposes of completing the job at hand, the depth of the tool in the ground may be an important factor. That is, when planting, for example, a planter may want to control the furrow depth. When redressing a roadway bed, the operator may want to ensure that a particular amount of existing pavement, existing ground, and/or underlayment is being processed.

In many of the above listed examples, the various spatial relationships between the ground engaging tool, a portion of the machine that supports the tool, and the ground may be difficult to assess. Due to this problem, some of the above machines may simply allow the tool to rest on the ground and "float" relative to the machine using particular offset features to create the relationship desired between the ground and the tool. However, where larger amounts of power are desired and, where, for example, the weight of the machine is desired to be used to more powerfully engage the ground, the tool may be adjustably fixed to the machine for engaging the ground rather than "floating."

In these circumstances, the relationship of the machine with the ground and the relationship between the machine and the tool may be helpful in determining the tool/ground relationship. However, due to several factors, these relationships are not always readily ascertainable. For example, inconsistent, uneven, soft, loose, or hard ground surfaces may cause the machine or implement to ride differently depending on the nature of the surface it is being used on. Machine tolerances may differ from one machine to another and may change over time as parts and components wear. Tire pressures on larger machines may affect the height that the machine rides relative to the ground. Suspension or other wheel connection features may create disparities from machine to machine or from one portion of the machine to another. Side to side unevenness on the ground can also create difficulty when establishing a relationship between a tool and the ground. Still further, adjustable components of the machine may add to the complicated nature of establishing the tool's position relative to the ground.

Other related technologies may include some of the following. For example, U.S. Pat. No. 9,970,164 relates to a milling machine with a location indicator system. European Patent 547,378 relates to an ultrasonic control device for a mobile milling machine. U.S. Patent Application 2002/0047301 relates to a method for the integrated management of the parameters regarding the cutting of road surfaces and a road scarifier for implementing the method. However, a distinction between a reclaimer (i.e., rotary mixer) and the mentioned systems is that the rotor of a reclaimer is adjustable in height relative to the frame of the machine, whereas a rotor on a cold planer, for example, is typically fixed relative to the machine. Different issues arise when dealing with a rotary mixer or other implement where the ground-engaging tool is adjustable relative to the frame of the machine.

SUMMARY

In one or more embodiments, an implement with a ground-engaging tool may include a frame supported above a surface of a ground by a ground-engaging portion and a suspension and a tool supported by and adjustable relative to the frame and configured for working the ground. The implement may also include a plurality of ground sensors configured for capturing distance measurements to determine the position of the frame relative to the surface and a control and monitor system configured for establishing a nominal scratch position of the tool relative to the surface based on the distance measurements.

In one or more embodiments, a method of controlling a rotor tool depth of a milling machine may include calculating a frame height and orientation above a surface of ground based on a plurality of distance measurements from a plurality of distance sensors. The method may also include calculating a frame height of the frame at a support location of a rotor control lever of a rotor tool of the milling machine. The method may also include calculating a rotor tool position based on a position and geometry of a rotor control lever and geometry of the rotor tool.

In one or more embodiments, a method of operating a milling machine may include adjusting a suspension system of a machine to position a chamber of the machine at a selected distance above a supporting ground surface. The selected distance may be a fractional distance relating to a stroke length of a ground guard on the chamber.

DETAILED DESCRIPTION

Figure 1:
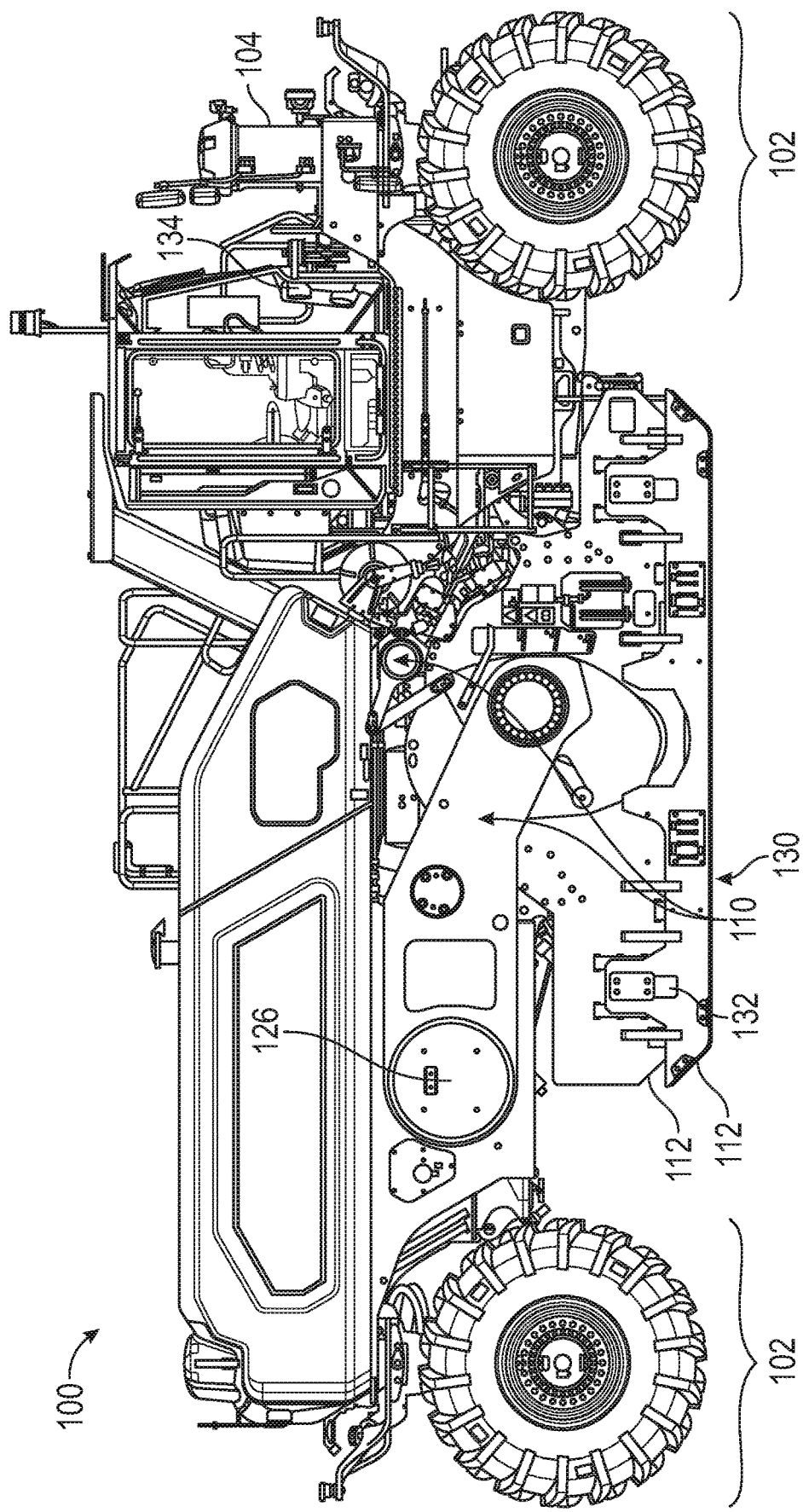
FIG. 1 is a side view of a rotary mixer, according to one or more embodiments.
Figure 2:
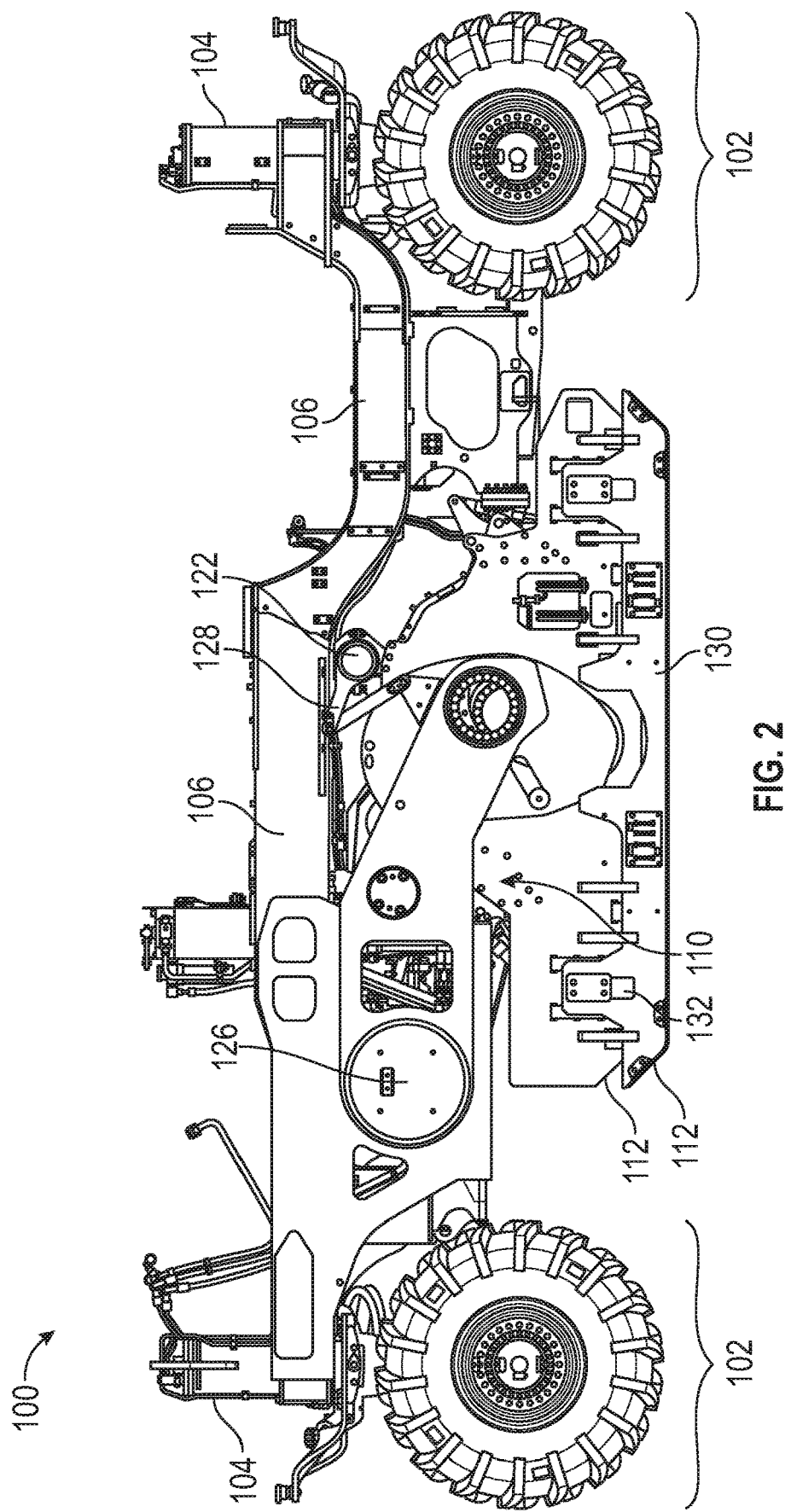
FIG. 2 is a side view of a frame and rotor portion of a rotary mixer, according to one or more embodiments.
Figure 3:
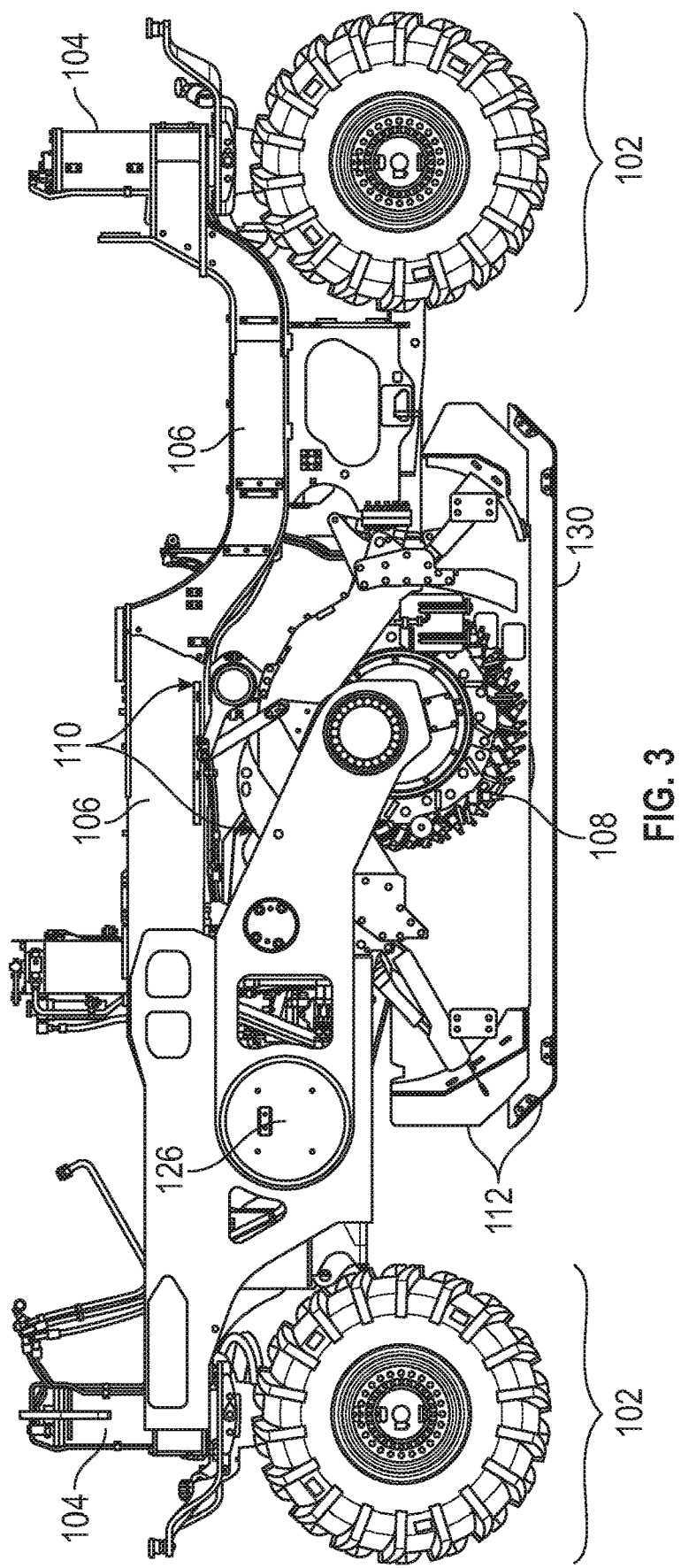
FIG. 3 is a side view of the frame and rotor portion of FIG. 2 with a side of the rotor housing removed, according to one or more embodiments.

Referring now to FIGS. 1-3, a rotary mixer 100 is shown. The rotary mixer 100 may be adapted to cut and/or process a top layer of the ground such as an existing roadway or a new or existing roadway bed. In particular, the rotary mixer 100 may be adapted to cut and/or process a top layer of dirt, gravel, pavement, or other soil. The cutting/processing may involve tearing the desired layer up, mixing it, and laying it back down in a more homogenous arrangement allowing the surface to be compacted and pavement to be placed thereon. As such, the position of the rotor relative to the surface of the ground and, accordingly, the depth of cut that the rotor is performing, are valuable parameters to assess and to be able to control. Various components of the rotary mixer 100 may be relevant in assessing and controlling the rotor position relative the ground. For example, the rotary mixer 100 may include a ground-engaging portion 102, a suspension 104, a frame 106, a rotor 108, a rotor support system 110, and a rotor housing 112. Apart from the rotor housing 112, a portion of which may float compared to the rotor 108, each of these components may play a role in controlling the position of the rotor 108 relative to the ground.

The ground-engaging portion 102 may engage the ground for purposes of supporting the rotary mixer 100. For example, the ground-engaging portion 102 may include a plurality of wheels or tracks for supporting the rotary mixer 100 and translating the rotary mixer 100 along the ground. In one or more embodiments, the ground-engaging portion 102 may include four wheels. Alternatively, three wheels may be provided. The wheels may include tractor-type wheels of relatively large size with tires having treads for engaging soft and/or loose soils. The wheels/tires may have a large width for distributing high loads to soft soils without sinking and a large diameter for more readily managing holes, obstructions, or sinkage in the soft soils. However, tire size may be selected based on machine weight, anticipated use conditions, or other factors and most any suitable tire size may be used.

The ground-engaging portion 102 may include an axle or axles tying corresponding wheels together or the wheels may be independent from one another. The ground-engaging portion 102 may be powered to advance the mixer across the ground and, as such, a drive axle or drive shaft may extend to pairs of wheels or each individual wheel. The drive axle or shaft may be powered by a hydraulic drive system. Alternatively, a combustion engine having a transmission for transferring power to the drive shaft/axles or an electric powered motor may be provided. The wheels or other ground-engaging portions 102 may be steerable in pairs or independently and the machine may include front or rear steering or both.

Figure 4:
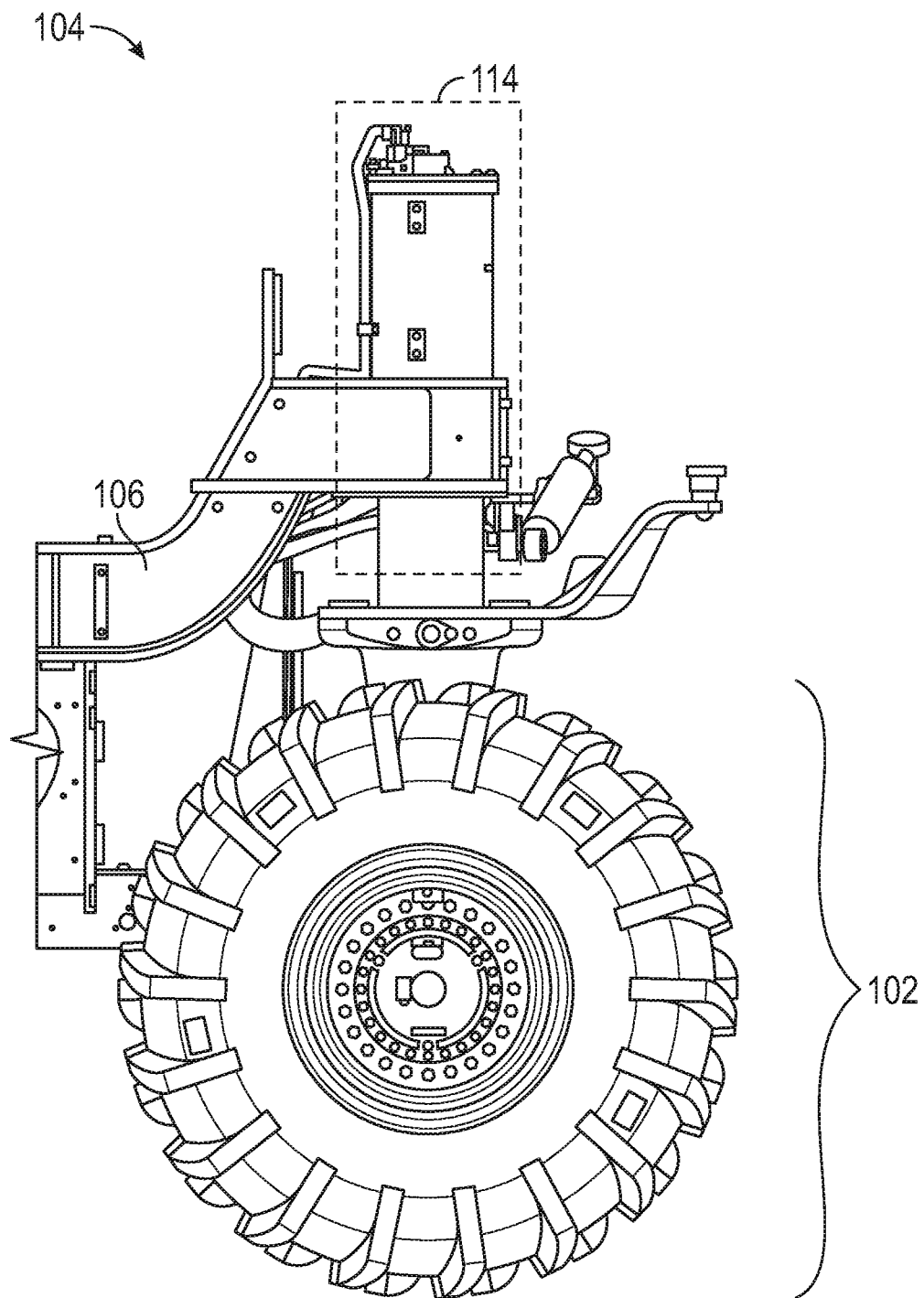
FIG. 4 is a close-up side view of a ground-engaging portion and suspension system, according to one or more embodiments.

The suspension system 104 may support the frame 106 relative to the ground-engaging portion 102. In one or more embodiments, the suspension system 104 may include an adjustment mechanism 114 configured to control the position between a wheel or other ground-engaging portion 102 and a respective portion of the frame 106. As depicted in FIG. 4, the adjustment mechanism 114 may include, for example, an extendable leg, such as a telescopic leg or a lever arm, a scissor lift, or other adjustment mechanism 114 may be provided. The adjustment mechanism 114 may allow for a flexible position of the ground-engaging portion 102 relative to the frame 106. However, and unlike many suspension systems 104, the position of the ground-engaging portion 102 relative to the frame 106 may be precisely controlled and secured.

In one or more embodiments, as shown in FIG. 4, the flexible and controllable adjustment mechanism 114 may include a telescopic leg. The telescopic leg may include a hydraulically controlled leg allowing the leg to be precisely extended or withdrawn by the operator. The telescopic leg may be in fluid communication with a hydraulic pump and valving system allowing for delivery of pressurized hydraulic fluid to the leg to lengthen or shorten the leg and, as such, push the wheel 102 away or draw the wheel 102 closer to the frame 106. The leg may be equipped with sensors allowing the amount of extension of the leg to be monitored or determined as the leg is extended. The valving system may allow the leg to be positioned using the hydraulic pressure and then held in position by closing the valves and securing the hydraulic position of the leg. This may provide for a substantially rigid and precisely controlled position of the wheel 102 relative to the frame 106. The hydraulic system of the several wheels 102 may be part of a single hydraulic system for the machine relying on, for example, a centralized pressure reservoir. However, valving and other controls may allow for independent or grouped control of the legs. In one or more embodiments, the machine may include a single leg corresponding to each ground-engaging device or wheel 102, for example. In other embodiments, multiple legs per wheel 102 may be provided or, alternatively, less than one leg per wheel 102 may be provided such as one leg per pair of wheels 102, for example.

The suspension system 104 may allow for rigid control of the wheel positions relative to the frame 106. However, in one or more embodiments, the system 104 may be set to float, where, for example, the legs would be allowed to extend or retract based on the contour of the terrain. This may be useful, for example, when the machine is in a travel condition with the rotor 108 lifted away from the ground. In float mode with the machine at the travel position, the legs/cylinders may function more like a shock absorbing suspension system, which may be better for the machine and the operator during transport of the machine from one location on a project to another, such as when travelling from a haul position to a work position, for example.

The frame 106 may be configured to span between the several portions of the suspension system 104, support the operator and the controls of the system 100 as well as provide a structure for supporting the rotor 108. The frame 106 may include a tubular structure including longitudinally extending members, cross members, and/or diagonally extending or angled members. While tubular members have been mentioned, other structural shapes including plates, bars, channels, angle shapes, or other structural shapes may be provided. Moreover, the structural shapes may be rolled, bent, curved, or otherwise formed to accommodate particular aspects, components, and shapes of the machine 100. The frame 106 may include one of a litany of selected arrangements of members adapted for securing the suspension system 104, the rotor 108, the rotor housing 112, the power source, the hydraulic system, and other features. In one or more embodiments, the frame 106 may form a relatively strong bridge from the front suspension system 104 to the rear suspension system 104 and may include an archway there under for arrangement and support of the rotor 108 and the rotor housing 112.

Figure 5:
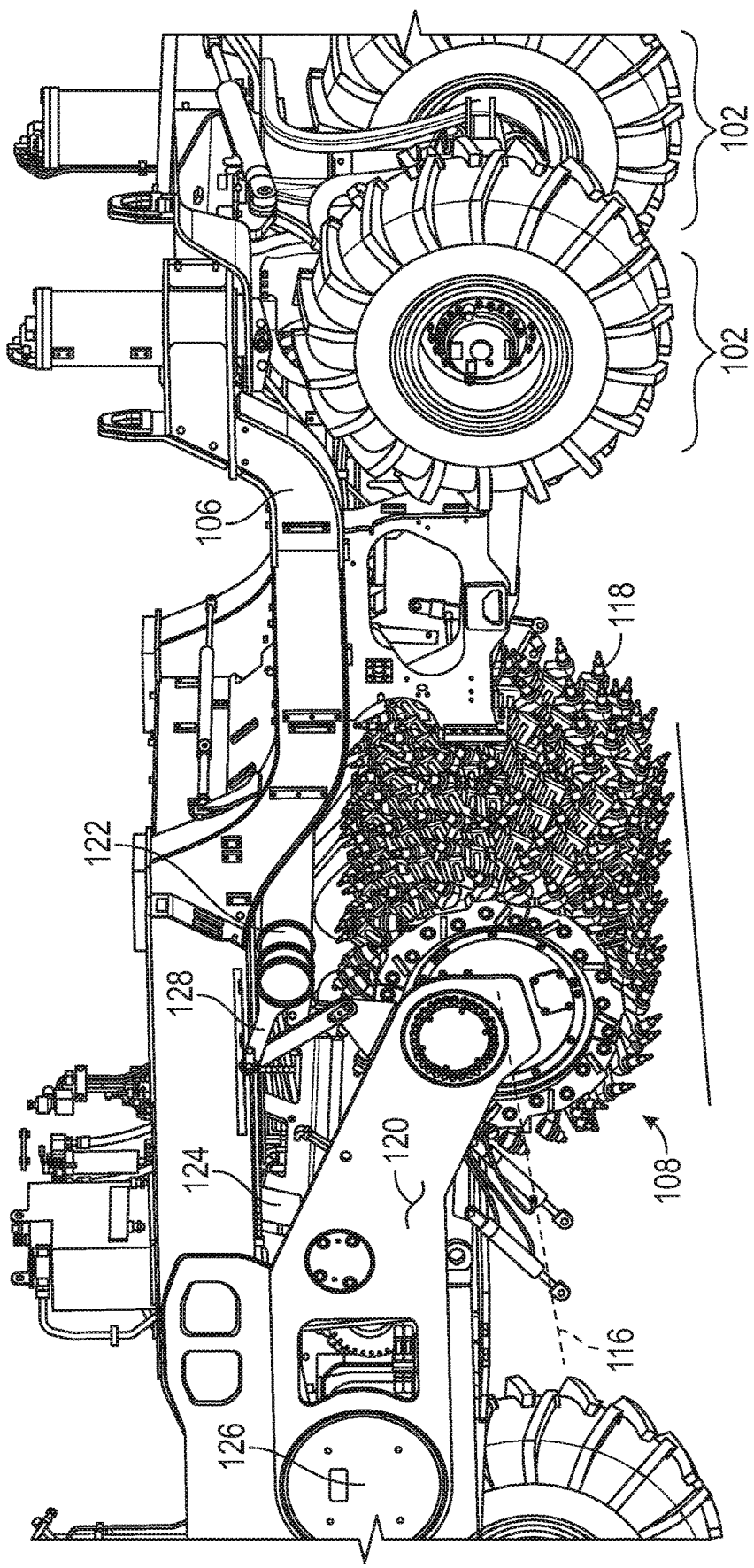
FIG. 5 is a perspective view of the rotary mixer of FIG. 1, with the mixer housing removed and showing the rotor position being canted relative to the ground surface, according to one or more embodiments.

As shown in FIG. 3, and in closer view in FIG. 5, the rotor 108 may be suspended from the frame 106 and may be adapted to cut, mix, or otherwise process a top layer of material arranged beneath the rotary mixer 100. The rotor 108 may include a generally cylindrical can or drum arranged with an axis 116 extending generally across the machine, between the front and rear ground-engaging portions 102, and below the frame 106. The can or drum may be arranged on an axle or other spindle adapted for support at each end and also adapted for powered rotation of the rotor 108. In one or more embodiments, the rotor 108 may be supported from a single end and/or at one or more points along its length such as in the middle, for example.

The rotor 108 may include teeth, blades, spurs, or other cutting elements 118 arranged on a surface or other outer facing portion of the can or drum. The cutting elements 118 may be particularly adapted to cut, shave, and mix material below the mixer. The cutting elements 118 may be particularly well suited for cutting, shaving, and/or mixing existing pavements, soil, gravel, rock, or other relatively hard surfaces. As such, the angle of attack of the cutting elements 118 may be precisely controlled or determined and each individual cutting element 118 may be adapted for particular purposes relative to the group of cutting elements 118. Some cutting elements 118 may include carbide or other relatively hard materials and may be adapted for primary cutting, while other cutting elements 118 may include other materials and may be better adapted for mixing. The cutting elements 118 may be arranged such that they are each individually successful in cutting material and the cutting elements 118 as a whole may be arranged to mix the material and avoid caking or otherwise collecting on the rotor 108. In one or more embodiments, the full width or substantially the full width of the rotor 108 may include cutting elements 118 adapted to contact the ground and the elements may be staggered such that particular elements are contacting the ground at any given time, while others are not, as the rotor 108 rotates.

As shown in FIGS. 3 and 5, the rotor 108 may be supported and controlled by a rotor support system 110. The support system 110 may include a rotor control lever 120 and a torsion bar 122. The control lever 120 may be configured to support and control the position of the rotor 108, while the torsion bar 122 may function to provide supplemental support of the rotor 108. The control lever 120 may include a pair of arms each pivotally supported by the frame 106 and extending along respective sides of the rotor 108. The arms may be adapted to operably engage the ends of the axle of the rotor 108 thereby supporting the rotor 108 and allowing the rotor 108 to rotate. Power to drive the rotor 108 may be provided along one or both of the control arms via a drive axle or other power source.

The control lever 120 may include a cross member configured for engagement by a hydraulic cylinder or other actuation device 124. The cross member may be arranged between the pair of arms at a point between the pivoting connection of the arms to the frame 106 and the rotor 108. The hydraulic cylinder may, thus, control the pivoted position of the pair of arms and, as such, the position of the rotor 108 relative to the frame 106 of the machine. In one or more embodiments, the hydraulic cylinder or other actuation device 124 may include multiple hydraulic cylinders. In one or more embodiments, the cross member may be omitted and each arm of the control lever 120 may include a hydraulic cylinder connected directly thereto. In one or more embodiments, lateral tipping of the rotor 108 may be avoided and synchronous motion of the control arms may be provided. This may occur by structurally forcing synchronous motion (i.e., by tying the two arms together structurally) or by controlling respective hydraulic cylinders in a synchronous fashion.

Figure 6:
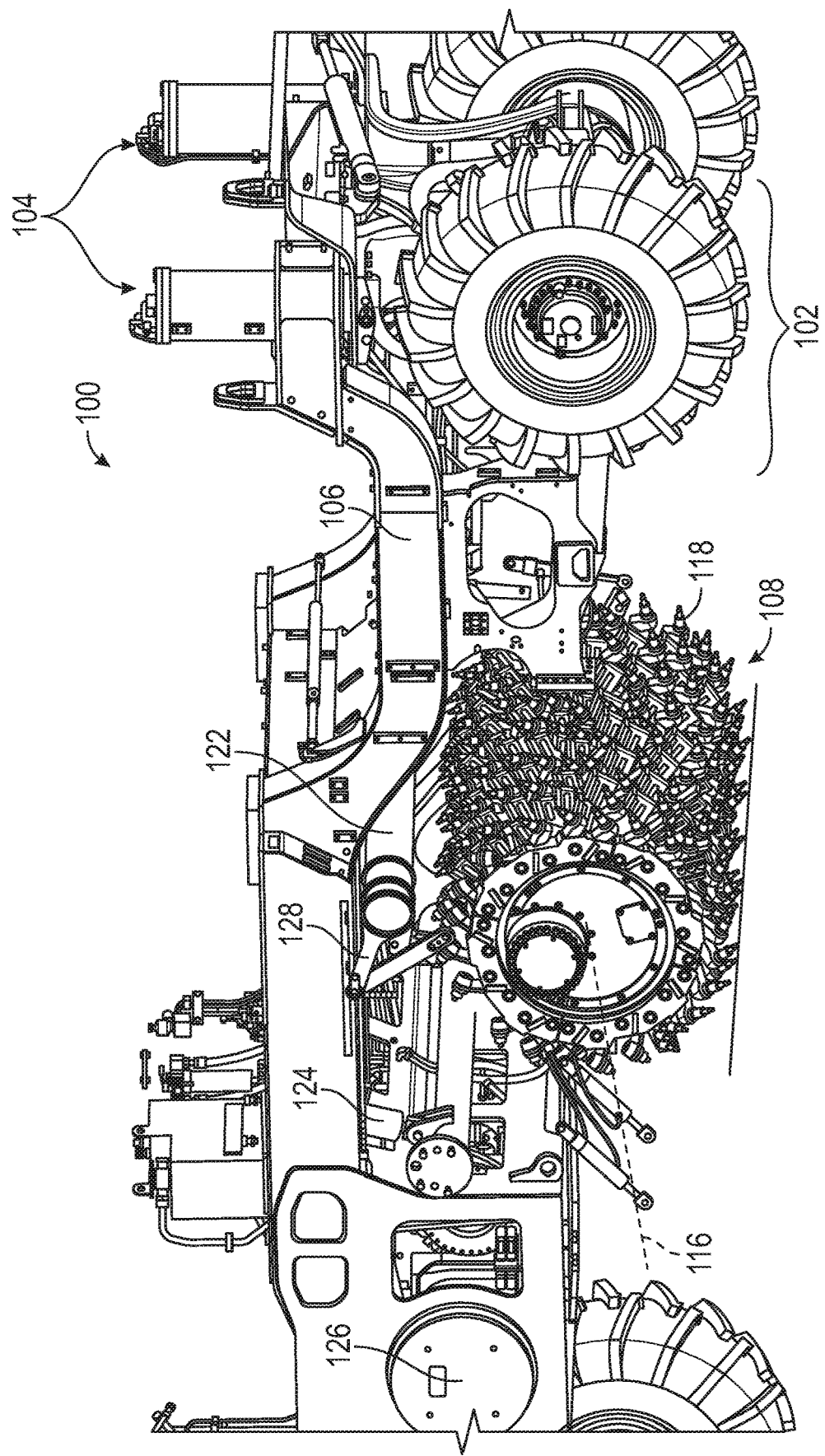
FIG. 6 is a perspective view of the rotary mixer of FIG. 4 showing the rotor in an actual scratch position, according to one or more embodiments.

As may be appreciated from a review of FIGS. 3, 5, and 6, the control lever 120 may be adjusted hydraulically to pivot the control arms about their pivot points 126 and, thus, control the position of the rotor 108 relative to the frame 106. The torsion bar 122 may be in place and connected to the rotor 108 to offset the weight of the rotor 108 allowing the control lever 120 to precisely control the position of the rotor 108 and reducing the effect of the rotor weight on the control lever 120. In one or more embodiments, the torsion bar 122 may be arranged generally parallel to the rotor 108 and between the rotor 108 and the frame 106. The ends of the torsion bar 122 may include linkages 128 at each end connecting the ends of the torsion bar 122 to the rotor 108. The torsion bar 122 may be supported by brackets off of the frame 106 and may generally resist differential rotation at each of its ends. As such, the weight of the rotor 108 may induce a bending moment in the linkages 128 on each end thereof and causing torsion in the torsion bar 122, which the torsion bar 122 resists. The linkages 128 on opposing ends of the torsion bar 122 may be arranged to induce equal and opposite torsion forces in the torsion bar 122. The torsion bar 122 and linkages 128 may, thus, function as a force resisting spring.

Due to the aggressive interaction between the rotor 108 and the ground, particles or debris may fly from the rotor 108 and may not be contained as desired. This flying debris may also be a hazard to workers or personnel operating the machine. Accordingly, a rotor housing 112 may be provided to contain the debris and allow for the debris to be maintained at or around the rotor 108 to allow for further mixing. The rotor housing 112 may include a steel plate or other separation members forming a housing 112 around the rotor 108 on the front, rear, and sides of the rotor 108. In one or more embodiments, the housing 112 may surround the rotor 108 as mentioned, but it may be supported by the frame 106 so as to avoid imparting additional load on the control levers 120. Moreover, supporting the housing 112 from the frame 106 may be well suited for machines having adjustability for cross slope. However, and alternatively, the housing 112 may be supported by the control levers 120 of the rotor support system 110 so as to move with the rotor 108 as the rotor 108 is adjusted upward and downward relative to the frame 106, while also being supported by the ground when the housing 112 contacts the ground.

The housing 112 may also include a ground guard 130 adapted to generally continuously engage the ground so as to seal off the working area of the rotor 108. The ground guard 130 may, for example, be arranged like a skirt on a bottom edge of the housing 112. The ground guard 130 may include skids or skis on a bottom edge thereof that engage the ground and support the guard 130 relative to the ground. The ground guard 130 may be slidably supported by the housing 112, such that the ground guard 130 may move up and down relative to the housing 112 substantially independently of the housing position. For example, as shown in FIGS. 1 and 2, the ground guard 130 may be secured to the housing 112 with a bar extending outward to a cleat or plate. The ground guard 130 may include a sliding slot 132 for slidably engaging the bar and allowing the ground guard 130 to articulate upward and downward as the housing 112 gets closer and further away from the ground respectively. In this way, so long as the range of motion of the ground guard 130 is not exceeded, the ground guard 130 helps to ensure that generally continuous contact with the ground is made to seal the rotor 108 working area.

Figure 7:
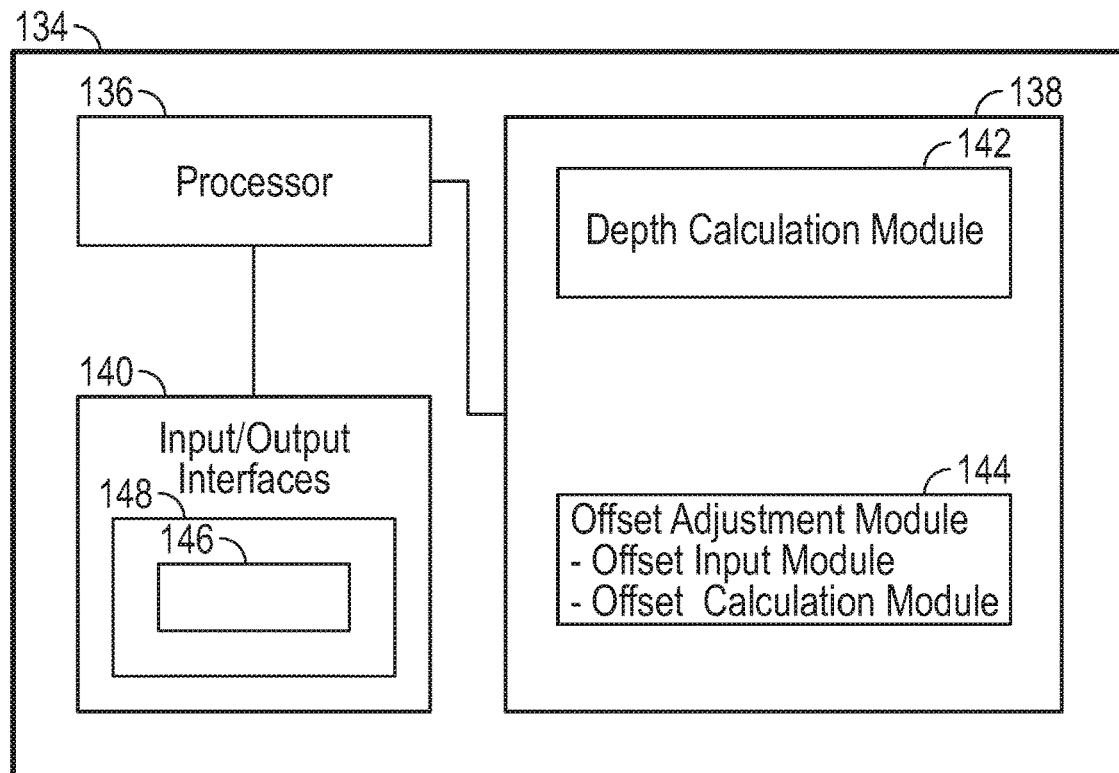
FIG. 7 is a schematic diagram of a control module, according to one or more embodiments.
Figure 8:
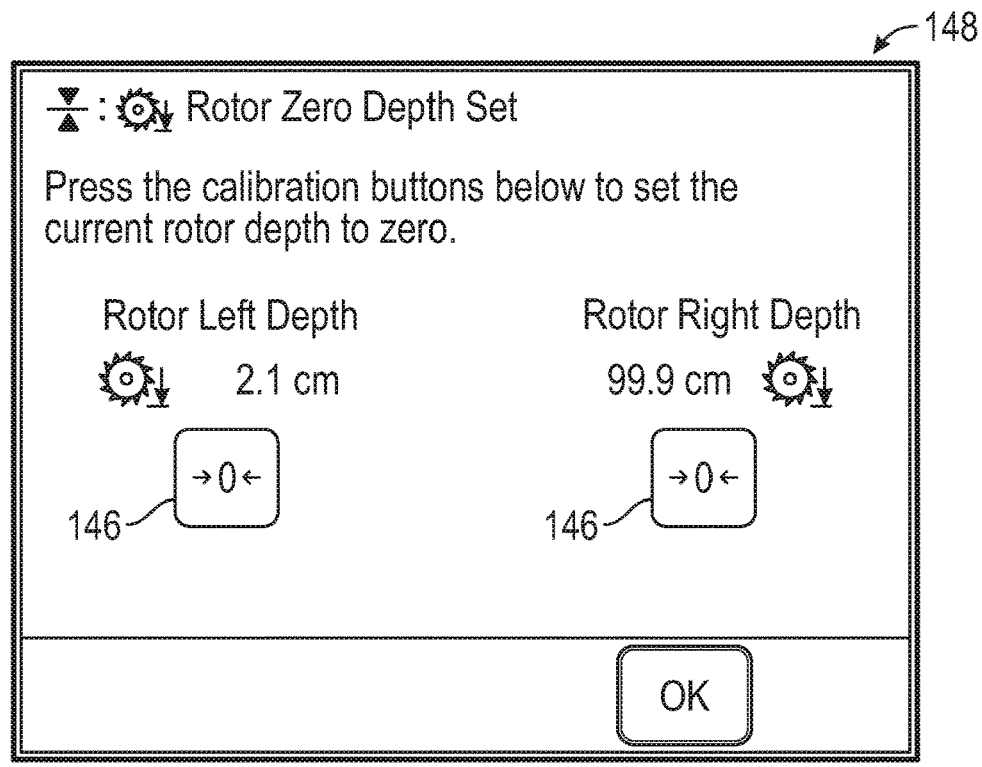
FIG. 8 is a view of an adjustment capture interface, according to one or more embodiments.

In addition to the various components that affect rotor depth, a control and monitor system or control module 134 may be provided to determine and/or control the rotor depth. That is, as shown in FIG. 1 and in more detail in FIG. 7, the rotary mixer or other implement 100 may include a control module 134 including a computing device equipped with a power source, a processor 136, a computer readable storage medium 138, and one or a series of user interfaces 140 including one or more of a key pad, a touch screen, a monitor, a joystick, a mouse, and/or other inputs/outputs. The control module 134 may include software or instructions stored in the computer readable storage medium 138 for processing by the processor 136 to control the machine. One or more particularly adapted modules may be provided as part of the control module 134 and may include software, hardware, or a combination thereof. For example, in one or more embodiments, a depth calculation module 142 may be provided for determining the nominal rotor depth and/or a more accurate or actual rotor depth relying on an offset adjustment. The depth calculation module 142 may, thus, include software and/or instructions to calculate and control the rotor position relative to the ground. In addition, and for purposes of determining the more accurate or actual rotor depth mentioned, an offset adjustment module 144 may be provided for capturing and adjusting the rotor depth based on factors that are not readily ascertainable. In one or more embodiments, as shown in FIGS. 7 and 8, an adjustment capture module 146 may be provided for capturing one or more adjustment offsets for the rotor or tool 108 depth. The adjustment capture module 146 may cooperate with the offset adjustment module 144 and the depth calculation module 142 to allow the operator to more readily appreciate the rotor depth relative to the ground. In one or more embodiments, as shown in FIG. 8, the adjustment capture module 146 may be provided in conjunction with a depth gauge 148 showing the operator the rotor 108 position relative to the ground.

More particularly, the control module 134 may be relied on to process the software or instructions on the computer readable storage medium 138 to adjust the rotor position relative to the ground, establish a scratch position, and adjust the rotor 108 from the scratch position to a desired depth of cut or depth of mixing/processing. The software or instructions on the computing device may account for a series of ascertainable factors affecting the rotor position. In one or more embodiments, the system may include an offset adjustment to account for other factors not readily ascertainable and not incorporated into the system calculations. The offset adjustment may be different for each side of the rotor 108 and, as such, independent offset adjustments for each side of the rotor 108 may be provided.

In one or more embodiments, the depth calculation module 142 may add several dimensions to establish a frame height for each side of the machine. Since the rotor height is adjustable relative to the frame 106 by pivoting the control lever 120 about a pivot point 126, the frame height may be established at the pivot point 126 of the control lever 120. From these respective heights a height for each side of the frame 106 at the pivot points 126), the system may subtract several dimensions to establish a rotor height for each side of the rotor 108. Aside from factors that affect rotor height that are not readily ascertainable (i.e., assuming these factors do not appreciably affect the rotor height, which may not always be the case), the calculations may be used to establish a nominal scratch position and a depth of cut of the rotor 108.

More particularly, for example, the depth calculation module 142 may have information regarding wheel size, rim size, tire size, and tire pressure in addition to overall vehicle weight. The system may use these dimensions and information to establish an overall diameter of the wheel system and may incorporate tire sag under load to establish the center point of the wheel 102 above the ground surface. The center point of the wheel 102 may have a known offset from the frame 106 based on the suspension system 104 and adjustments in the suspension system 104 may be used to establish heights of the frame 106 at each of the leg positions of the vehicle. Given the several frame positions, the height of the frame 106 at each pivot point 126 of the control lever 120 may be established using slope information relating the several frame positions at the legs. For example, side to side slopes may exist as well as front to back slopes and the height of the pivot point 126 for each side of the control lever 120 may be impacted by these slopes. Offsets, steps, or other frame shape features may also be included. In one or more embodiments, a more sophisticated approach to this may be used including a finite element analysis taking into consideration deflections in the frame 106 due to the forces imparted on the frame 106 in addition to the frame positions at the legs. Still other mathematical models may be used. Further calculations may be used to establish the height of the rotor 108. For example, the control lever 120 may pivot about a pivot axis extending through the two pivot points 126 and, as such, the rotor position may travel along an arc as it moves closer to and further away from the ground. The angle of the control lever 120 and its length may be used to establish a centerline position of the rotor 108 relative to the pivot point axis. Moreover, the diameter of the rotor 108, including the cutting elements 118, may be used to establish the position of the bottom of the rotor 108. Given the respective left and right positions of the rotor 108, the nominal position of the rotor 108 relative to the ground may be established by subtracting the distance from the pivot point 126 to the bottom of the rotor 108 from the height of the pivot point 126 above the ground. The above steps and/or portions thereof may be used to establish a nominal scratch position for the rotor 108. It is to be appreciated that the relative position and orientation of the several components of the machine 100 may be established using sensors 150 to assess elongation, retraction, rotation, etc. and such sensors 150 may be in communication with the control module 134 to provide positional information used in the calculations.

Moreover, and as mentioned, several other factors may affect the height of the rotor 108 relative ground and such factors may not be readily ascertainable. For example, the soil conditions (i.e., the softness or hardness) of the soil may affect how much the machine 100 sinks into the soil during use. Moreover, the soil conditions may change as the machine 100 travels along a working path and adjustments may need to be made throughout a project. Other factors may include the effect of air pressure in the tires, wearing of components such as bearings or other components affecting spatial relationships or offsets between components. Still other factors may exist that are not readily ascertainable. In one example, a rotary mixer 100 may be used to cut into an existing roadway surface and one side of the machine 100 may be supported by the ground off the side of the pavement while the other side of the machine 100 may be supported more near the center of the roadway and on the pavement. Accordingly, the side supported by the ground may sit lower than the side supported by the pavement due to the softness of the ground and/or due to elevation changes between the pavement and the ground.

To address these factors that are not readily ascertainable, the system may include an offset adjustment module 144. The offset adjustment module 144 may be used with respect to each side of the rotor 108 to accommodate differences from one side of the machine 100 to another. The offset adjustment may be established as described in more detail below and may be included in the calculations to more accurately establish a scratch position and/or a depth of cut of the rotor 108. That is, for example, where the calculated position results in a rotor position that is actually below the surface, the offset adjustment may be used to raise the rotor position that is understood to be at a scratch position. Where the calculated position results in a rotor position that is actually above the surface, the offset adjustment may be used to lower the rotor position that is understood to be at a scratch position.

With reference to FIGS. 5 and 6, in one or more embodiments, a control and visual inspection process may be used to establish and capture the offset adjustment. For example, the rotary mixer or other implement 100 may be delivered to a project site and offloaded for operation. The rotary mixer or other implement 100 may then be driven to and/or arranged in its working environment. In one or more embodiments, initial operation of the machine 100 may be conducted to allow the machine 100 to settle into its operative position. That is, the vibrations and shaking of the machine 100 may have an effect on its ride height relative to the ground and initial operation may help to establish a baseline of its ride position. The rotor height may be calculated by the system and the operator may adjust the rotor to a nominal scratch position. For example, the operator may adjust the rotor 108 such that the cutting elements 118 of the rotor 108 are thought to be flush with the ground. However, this adjustment may be made without knowledge of several of the factors mentioned that are not readily ascertainable. Accordingly, while the machine 100 may adjust the rotor 108 to a position it believes to be flush with ground, the rotor 108 may not actually be flush as shown in FIG. 5. To address this, the operator or support personnel may inspect the rotor 108 to determines its position relative to the ground. Where the rotor 108 is too deep or where the rotor 108 is above the ground, the operator may adjust the machine 100 to place the rotor 108 flush with the ground as shown in FIG. 6. For example, the operator may adjust the suspension legs to tip the machine 100 from side to side or the operator may adjust the suspension legs to tip the machine 100 from front to back or adjust the height of the machine 100 without tipping. Moreover, the control lever 120 may be used to adjust the height of the rotor 108 relative to the frame 106. The operator may manually make the adjustments and may use visual inspection or sensors 150 to determine when each side of the rotor 108 is in contact with or flush with the ground. At that point, the adjustment capture feature 146 of the system may be used to capture the position of the rotor 108 compared to its nominal position for each side of the rotor 108. The system, and in particular, the offset adjustment module 144, may then incorporate the captured offset into the rotor position calculations performed by the depth calculation module 142 by adjusting the position of the rotor 108 upward or downward based on the adjustment to accommodate the factors that are not readily ascertainable. The adjustment capture feature 146 of the system may lye with respect to each side of the rotor 108 and, as such, may be used to accommodate side to side tipping of the machine 100 using leg adjustments to tip the machine 100 so as to provide a rotor 108 that operates generally parallel with the surface of the ground. As may be appreciated, the offset adjustment module 144 may provide a revised baseline based on actual in-field conditions allowing the operator to more confidently rely on variations from the baseline. More particularly, by using the adjustment capture feature 146, the depth gauge 148 may be reset to a depth of zero when the rotor 108 is at an actual scratch position. As such, variations above or below the zero point may more accurately reflect the rotor position relative to the ground surface taking the factors into account that are not readily ascertainable.

While effects of tire pressure have been said to not be readily ascertainable, particular knowledge of the tires being used and their response to pressure may allow for incorporation of tire pressure into the nominal rotor position. That is, given the relatively fine measurements associated with the depth of cut of the rotary mixer 100 and the size of the tires, the tire inflation may be a factor to consider when estimating or calculating the rotor position. Accordingly, tire pressure may be monitored on a continuous or periodic basis such that changes in tire pressure from temperature fluctuations or other factors affecting tire pressure may be addressed. In one or more embodiments, an adjustment table may be established for a particular tire where, for example, a range of tire pressures may be associated with a range of height adjustments for the machine. Where the tire pressure is at a design pressure or expected pressure, the adjustment may be zero. However, where the tire pressure is above the design pressure, the machine 100 may be adjusted down (i.e., closer to the ground or other supporting surface) to compensate for an elevation of the machine. In contrast, where the tire pressure is low, the machine 100 may be adjusted upward (i.e., further from the ground or other supporting surface) to compensate for overly sagging tires. Each of the tires may be monitored independently and may be compensated for by adjusting its associated leg or other suspension system 104. In one or more embodiments, each leg may be independently adjustable. In other embodiments, some of the legs may be independently adjustable and other legs may be adjustable in pairs. For example, in one or more embodiments, the front legs may be independently adjustable and the back legs may be adjustable as a pair.

In one or more embodiments, tables of axle height to tire pressure may be established using modeling or empirical techniques such that measurements of tire pressure may be used to more accurately establish the axle height of an axle supported by the wheel 102. In one or more embodiments, the system may include a process of receiving tire pressure input and adjusting the height of the frame 106 at the respective wheel 102 according to the tire pressure by looking up an offset value in a table or otherwise incorporating tire pressure into the frame height at a respective wheel 102.

Figure 9:
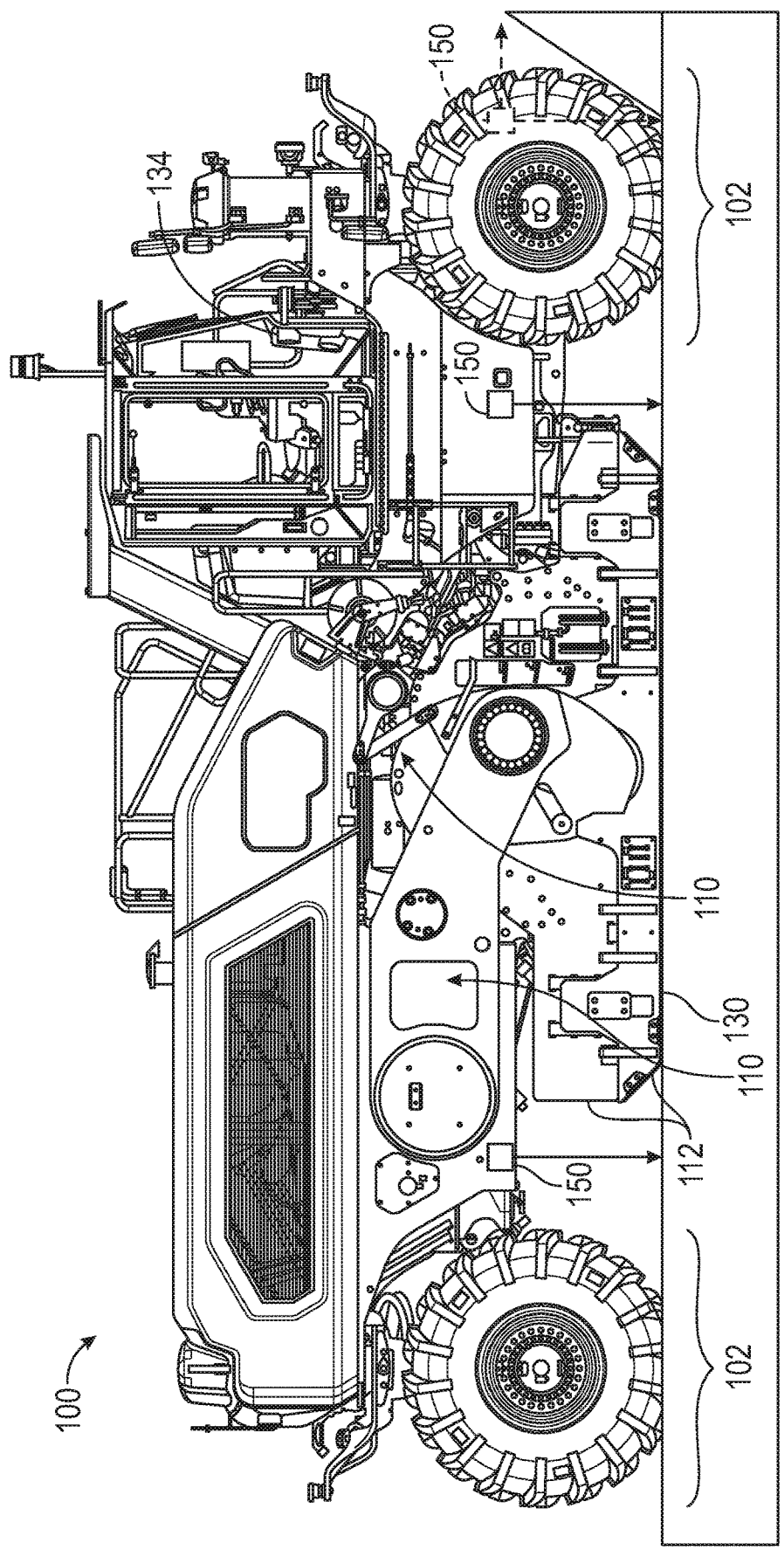
FIG. 9 is a side view of the rotary mixer of FIG. 1 including with sensors, according to one or more embodiments.

While a visual inspection approach to establishing the offset adjustment has been mentioned, in one or more embodiments, a more automated or sensor-based approach may be used. This sensor approach may be used in addition to or as an alternative to the visual inspection approach mentioned above. As shown in FIG. 9, the machine 100 or implement may include one or a plurality of sensors 150 may be arranged on or about the machine 100 or implement that are configured for sensing surrounding environmental features. For example, and as shown, sensors 150 may be provided on each of a left side and a right side of the machine 100 and on a front of the machine. In one or more embodiments, the right side sensor 150 may include a front sensor 150 and a rear sensor 150 where the front sensor 150 is in front of the rotor 108 and the rear sensor 150 is in back of the rotor 108. Still other sensors 150 may be provided on a bottom of the machine, on a rear side of the machine 100 or on other surfaces. In one or more embodiments, the sensors 150 may be provided in locations less apt to get dirty or otherwise develop interference and, as such, the sensors 150 may be arranged relatively high on the machine 100 as opposed to at or near the ground surface. The sensors 150 may be directed downward and may be adapted to measure a distance between their respective mount positions and the ground. One or more sensors 150 may be directed outward toward an area in front of the machine, outward toward one or more areas to the sides of the machine 100 and/or downward and outward at an angle, for example. The sensors 150 may be adapted to gather information about the ground surface relative to the machine 100 to allow for more accurately determining a scratch position for the rotor 108.

The sensors 150 may be adapted to sense distance or other factors. In one or more embodiments, the sensors 150 may include cameras, sonic sensors, lasers, or other distance measuring sensors 150 or devices. The sensors 150 may be in electrical and data communication with the control module 134 and may be adapted to collect and transmit distance data to the control module 134 for use in determining the rotor depth or other operations. The sensors 150 may be identifiable by the control module 134 relative to one another and the location and relative positions of the several sensors 150 may be known and stored in the system. As such, the distance measurements from each sensor 150 may be associated with a location on the frame 106.

The sensors 150 may be adapted to provide an additional input into the depth calculation module 142, which may augment or override other assumed values, for example. In one or more embodiments, the sensors 150 may be used to establish the position of the frame 106 of the machine 100 relative to the surface of the ground surface at the sensor locations. This approach may allow for eliminating unknown factors or factors that are not readily ascertainable. For example, the effects of tire pressure, soft soils, uneven ground, or other factors can affect the position of the frame 106 relative to the ground and, as such, make it difficult to calculate the actual scratch position of the rotor 108. The sensors 150 may be used to directly measure the distance between the frame 106 and the ground at respective locations thereby allowing for a determination of the frame position (i.e., height and orientation) relative to the surface of the ground without needing information about soil softness, tire sag, etc. In one or more embodiments, three sensors 150 may be used so as to define a plane and allow for determination of the position of other portions of the frame 106.

Using the sensors 150, the system may identify the frame position relative to the ground and may, thus, be able to determine the position of the pivot points 126 or other support points of the rotor 108 relative to the ground. With further information regarding the rotor position based on the lever arm angle, the lever arm length, and the rotor geometry, the position of the rotor 108 relative the ground may be established. It is to be appreciated that inconsistencies in the ground surface between the several sensors 150 may cause errors in the determination of the rotor position relative to the ground and visual inspection may still provide for a slightly more accurate determination of rotor position. However, using the sensors 150, several factors that are not readily ascertainable may be eliminated or the effects of those factors may be reduced allowing for an ability to more accurately determine the rotor position. In one or more embodiments, using the sensors 150 may provide for a more accurate nominal scratch position. In some cases, an operator may still move the rotor 108 from this more accurate nominal scratch position to an actual scratch position and may use visual inspection to establish the actual scratch position. The user may also continue to use the offset adjustment capture module 146 to include an offset adjustment above and beyond the accurate nominal scratch position already established.

It may be appreciated that the above approach may assume a generally uniform ground surface between the several sensors 150. As may also be appreciated, in one or more embodiments, the ground surface may change as the rotary mixer 100 moves along the ground. That is, as shown in FIG. 9, an upward slope may be approached by the mixer. As the front wheels 102 begin to move up the slope, the rotor 108 may begin to be lifted out of the ground even though the surface of the ground at the position of the rotor 108 has not changed. In one or more embodiments, the system may store ground profile information allowing the rotor 108 to be adjusted to maintain its depth of cut unless/until the rotor 108 reaches the change in slope. For example, and with continued reference to FIG. 9, as the front of the machine 100 begins up the slope, the rotor position may be moved downward relative to the frame 106 to compensate for the upward movement of the frame 106 relative to the first surface. When the rotor 108 reaches the upward transition in the ground, the rotor 108 may be moved upward relative to the frame 106 to compensate for the frame 106 moving into a more parallel position with respect to the second surface. The sensors 150 may, thus, allow for the rotor 108 to maintain a depth of cut as the rotary mixer 100 transitions across differing slopes of ground.

Figure 10:
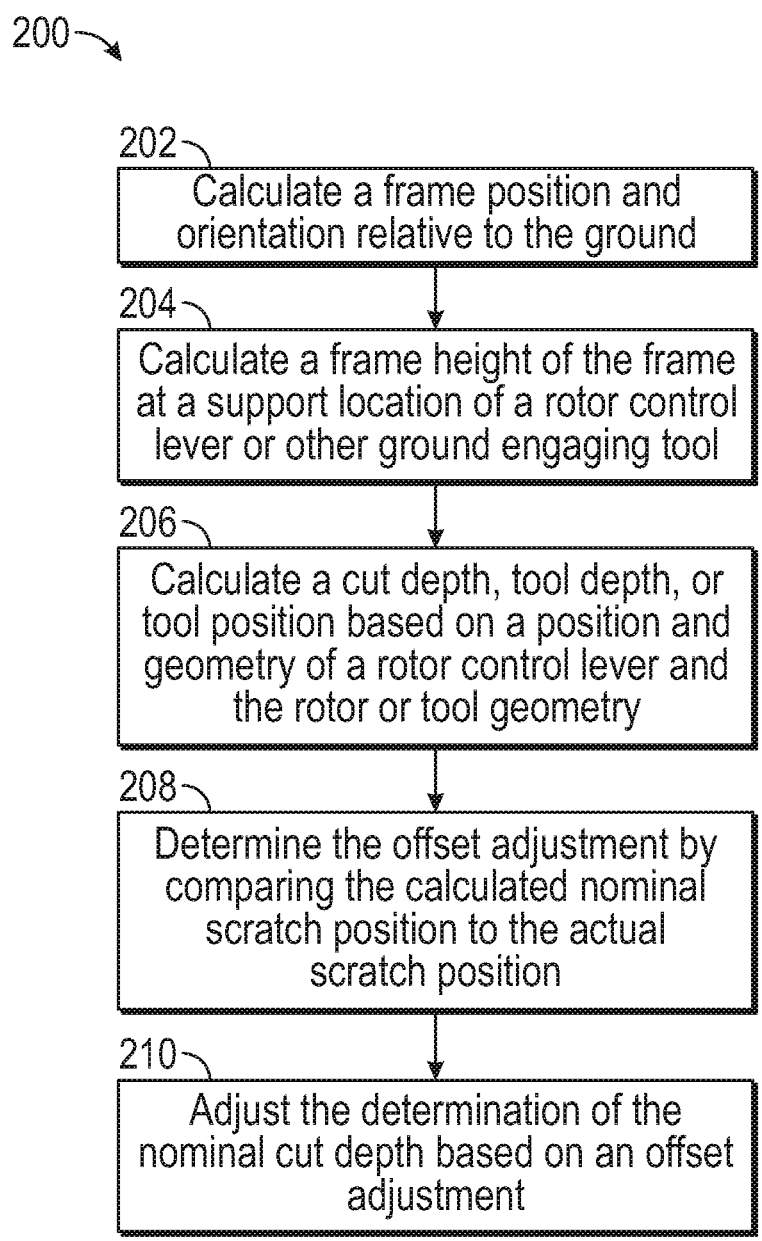
FIG. 10 is a diagram showing method operations performed by the control module to calculate a rotor position or depth.

In operation, the rotary mixer or other implement 100 may perform a method (200) of determining a rotor position or cut depth as shown in FIG. 10. The rotary mixer 100, and in particular, the control module 134 thereof, may calculate a frame position or orientation above the ground. (202) In one or more embodiments, this may be based on known machine geometry such as tire and rim size, tire inflation, suspension geometry, and other portions of the machine 100 between the ground and the frame 106. In one or more other embodiments, the system may rely on distance sensor data from distance sensors 150 to establish the frame position. That is, the control module 134 may receive distance and/or distance and location data from one or a plurality of ground sensors 150. The system may analyze the several positions of the frame 106 to establish an overall frame position. In either case, the system may also calculate a frame height of the frame 106 at a support location of a rotor control lever 120 or other ground engaging tool, for example. (204) Still further, the system may calculate a cut depth, tool depth, or tool position based on a position and geometry of a rotor control lever 120 and the rotor 108 or tool geometry. (206) Given the existence of factors that are not readily ascertainable, the system may adjust the determination of the nominal cut depth based on an offset adjustment. (210) The offset adjustment may include a distance between a nominal scratch position and an actual scratch position and may include an adjustment for the left and right sides of the machine. The offset adjustment may be established based on input from a user. For example, the operator may adjust the position of the rotor 108 and rely on visual inspection to iteratively adjust the rotor 108 until it is in an actual scratch position. The user may then depress a button or interact with an interface to inform the machine 100 that the rotor 108 is at an actual scratch position. The system may then determine the offset adjustment by comparing the calculated nominal scratch position to the actual scratch position. (208) In one or more embodiments, the system may automatically adjust the rotor position relative to the ground surface based on knowledge of current ground conditions and/or approaching slope changes. For example, the distance measurement devices may be used to track and store a ground profile as the rotary mixer 100 propagates across the ground allowing the rotor position to be adjusted as the ground changes.

Figure 11:
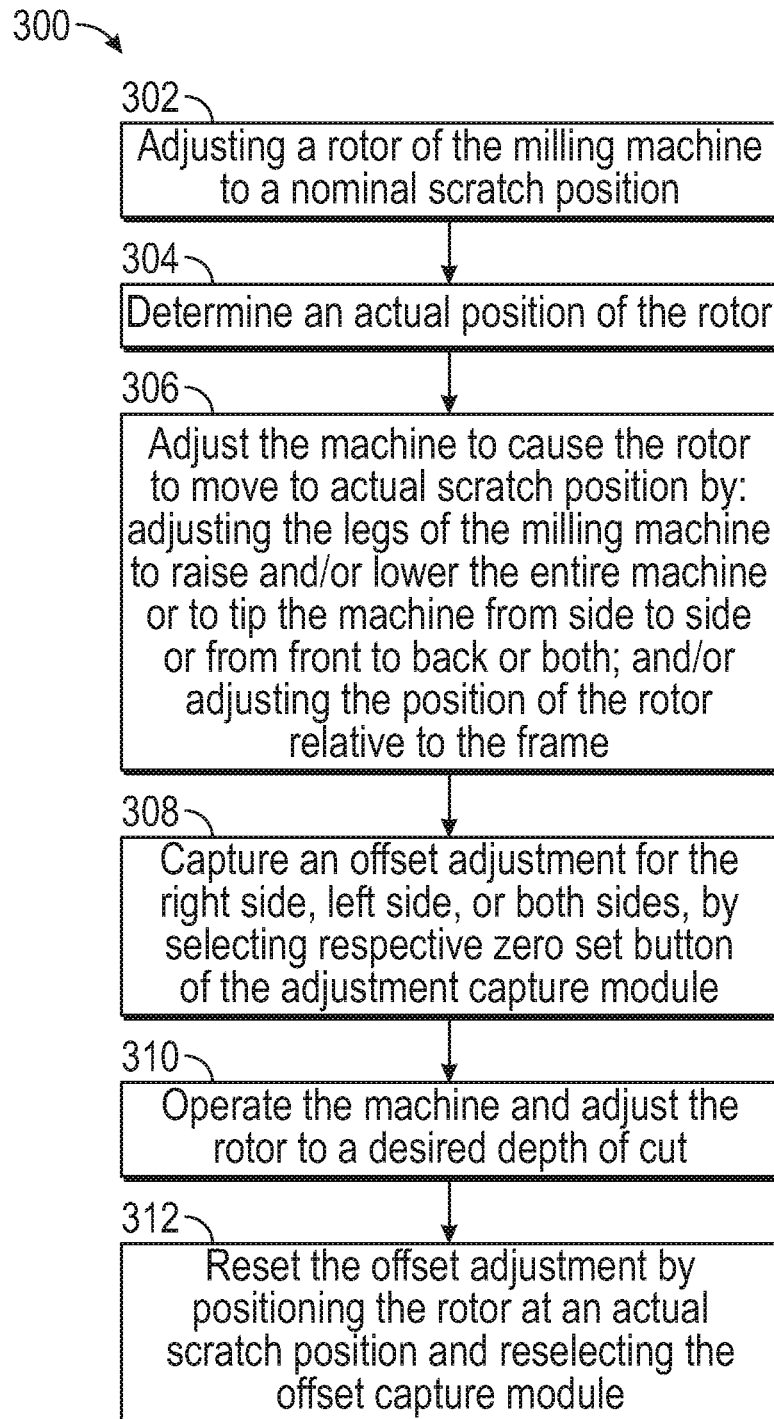
FIG. 11 is a diagram showing method operations performed by a user to adjust a rotor position and establish an actual scratch position.

From a user's perspective, a method (300) of operating a milling machine may include one or more of the steps shown in FIG. 11. For example, a user may adjust a rotor 108 of the milling machine to a nominal scratch position. (302) The user may adjust the rotor 108 based on the depth gauge 148 on the interface, while the system may rely on calculations based on machine 100 geometry, distance sensors 105, or both. In either case, the user may then visually inspect or rely on sensors 105 to determine an actual position of the rotor 108. (304) Where the nominal scratch position of the rotor 108 is not the same as an actual scratch position, the user may adjust the machine 100 to cause the rotor 108 to move to an actual scratch position. (306) More particularly, the user may adjust the legs of the milling machine to raise and/or lower the entire machine 100 or to tip the machine 100 from side to side or from front to back or both. Still further, the position of the rotor 108 relative to the frame 106 may be adjusted. These adjustments may be iterative and may be made based on visual inspection of the rotor 108 until the rotor 108 is arranged at an actual scratch position. At that time, it may be appreciated that the depth gauge 148 of the control module 134 may reflect that the rotor 108 is at a position that varies from the nominal scratch position. For example, the depth gauge 148 may indicate that one side of the rotor 108 is above scratch or that it is below scratch by some dimension. The other side of the rotor 108 may also be shown to be above or below scratch by some dimension. Having adjusted the rotor 108 from a nominal scratch position to an actual scratch position, the dimension shown on the depth gauge 148 may be the offset adjustment between nominal scratch and actual scratch positions of the rotor 108. As such, the user may capture an offset adjustment by selecting the zero set buttons of the adjustment capture module 146. (308) This may allow the system to capture the offset adjustment and use that adjustment going forward to accommodate factors that are not readily ascertainable. Selection of the capture module may reset the depth gauge 148 to zero allowing variations from the actual scratch position to be more readily appreciated by the user. It is to be appreciated that the user may capture the offset for the right and left sides of the machine 100 to accommodate right to left variances. The user may operate the machine 100 and may adjust the rotor 108 to a desired depth of cut. (310) Through the course of use, the soil conditions or other factors may change from time to time and the offset adjustment may be reset by positioning the rotor 108 at an actual scratch position and reselecting the offset capture module. (312)

It is to be appreciated that adjustment of the machine 100 (306) may be used for purposes beyond controlling rotor depth. That is, for example, the user may adjust the machine legs to a selected height for purposes of having the chamber carried or held at a particular height above ground. In one or more embodiments, the chamber height may be positioned such that the ground guards 130 engage the ground at the midpoint of their stroke. This selection may maximize and/or balance the available upward and downward motion of the ground guard 130 and, as such, may help to avoid having the chamber hang up on the ground while also allowing for accommodation of low ground areas to avoid rotor exposure. In other examples, the user may select an upper ¾ point of the stroke of the ground guards 130 to avoid exposure, but to provide more accommodations for high ground areas that may cause the chamber to hang up. Still other selections of the chamber position may be selected by the user. Moreover, the sensors 150 may readily allow for this type of adjustment.

INDUSTRIAL APPLICABILITY

The present disclosure, in one or more embodiments, relates to devices, systems, and methods for calculating the rotor position relative to the ground of a rotary mixer 100. The sensor technology disclosed herein may allow the nominal scratch position to be established more accurately by eliminating reliance on factors that are not readily ascertainable. The system allows the rotor 108 of a rotary mixer 100, for example, to be placed at nominal scratch position that is very accurate thereby reducing the need for visual inspections to arrive at an actual scratch position. While an actual scratch position may be established and the machine 100 may be reset, so to speak, to understand or learn where that position is, this process may be needed less often. That is, the nominal scratch position determined by the machine 100 based on ground sensors 150 may commonly be very close to the actual scratch position and as such, as a user adjusts the depth of the rotor 108 relative to the ground surface, the readings on the depth gauge 148 may be quite close to their actual values.

In addition, the sensor technology disclosed herein allows for quickly establishing the frame position relative to the ground and, as such, may allow for particular adjustments to carry and/or hold the rotor housing 112 at a desired position above the ground. For example, a user may be able to select the midpoint of the stroke of the ground guards 130 as the chamber height. This may allow the ground guard 130 to float between its bottom most point and upper most point thereby maximizing the play in the ground guard 130. This can help to avoid hang ups where the ground guard 130 reaches its upper most point and the chamber is still driving downward. Where the chamber forcibly engages the ground, the chamber may fight against the propulsion or forward forcing system and prevent or slow movement of the machine. The ability to control the chamber position relative the ground in a substantially accurate manner is very advantageous.

Still further, where a user wants to be even more accurate or where uneven ground conditions between the sensors 150 affect the rotor position, the user may still rely on the visual inspection approach to determine the actual scratch position and may use the adjustment capture feature to reset the zero point of the gauge. Variations from that reset position may be relied on by the operator to adjust the rotor depth without having to worry or keep in mind where the actual scratch position is. For example, and without the presently disclosed offset capture technology, the user may previously have had to adjust the machine 100 to an actual scratch position and make note of the rotor depth on the depth gauge 148. As the rotor 108 was adjusted, the user may then manually have had to consider the variations from the indicated depth on the gauge and do the associated math to understand the actual depth of the rotor 108. By providing the adjustment capture module 146, the depth gauge 148 can be reset to zero when the rotor 108 is at an actual scratch position and the machine 100 may adjust its calculations to perform the math and allow the depth gauge 148 to reflect the actual rotor depth relative to the ground.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may, in some cases, depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an element may still actually contain such element as long as there is generally no significant effect thereof.

What is claimed is:

1. An implement with a ground-engaging tool, comprising:
   a frame supported above a surface of a ground by a ground-engaging portion and a suspension;
   a tool supported by and adjustable relative to the frame and configured for working the ground;
   a plurality of ground sensors configured for capturing distance measurements to determine the position of the frame relative to the surface; and
   a control and monitor system configured for establishing a nominal scratch position of the tool relative to the surface based on the distance measurements, the control and monitor system configured to calculate a rotor tool position based on a position and geometry of a rotor support and geometry of the rotor tool.

2. The implement of claim 1, wherein the control and monitoring system is configured to determine the position of the frame based on the distance measurements.

3. The implement of claim 1, wherein the plurality of ground sensors comprises a left side sensor and a right side sensor.

4. The implement of claim 3, wherein the plurality of ground sensors comprises an additional sensor.

5. The implement of claim 1, wherein the ground-engaging portion comprises a plurality of wheel systems and the suspension system comprises an adjustable leg for each of the plurality of wheel systems.

6. The implement of claim 5, wherein the adjustable leg is configured for adjusting a position of the frame relative to the ground to place the tool in the nominal scratch position.

7. The implement of claim 1, wherein the control and monitoring system includes an adjustment capture input for capturing an offset adjustment.

8. The implement of claim 7, wherein the adjustment capture input comprises a left input for capturing a left offset adjustment and a right input for capturing a right offset adjustment.

9. A method of controlling a rotor tool depth of a milling machine, comprising:
   calculating a frame height and orientation of a frame above a surface of a ground based on a plurality of distance measurements from a plurality of distance sensors;
   calculating the frame height of the frame at a support location of a rotor control lever of a rotor tool of the milling machine; and
   calculating a rotor tool position based on a position and geometry of the rotor control lever and geometry of the rotor tool.

10. The method of claim 9, further comprising displaying the rotor tool position relative to the ground to an operator.

11. The method of claim 10, further comprising receiving instructions to adjust the rotor tool position.

12. The method of claim 11, wherein receiving instructions comprises receiving instructions to extend or retract a leg.

13. The method of claim 12, further comprising recalculating the rotor tool position and displaying the rotor tool position relative to the ground.

14. The method of claim 11, wherein receiving instructions comprises receiving instructions to adjust the rotor tool relative to the frame.

15. The method of claim 14, further comprising recalculating the rotor tool position and displaying the rotor tool position relative to the ground.

16. The method of claim 11, further comprising capturing an offset adjustment based on input from a user.

17. The method of claim 16, wherein the offset adjustment comprises a left offset adjustment and a right offset adjustment.

18. The method of claim 16, wherein capturing the offset adjustment comprises comparing a nominal scratch position of the rotor tool to the position of the rotor tool at the time of the input from the user.

19. A method of operating a milling machine, comprising:
   adjusting a suspension system of a machine to position a chamber of the machine at a selected distance above a supporting ground surface, wherein the chamber is defined by a housing including a ground guard slidably supported by the housing to move up and down relative to the housing through a stroke length and the selected distance is a fractional distance of the stroke length of the ground guard selected to balance the available upward and downward motion of the ground guard.

20. The method of claim 19, wherein the fractional distance is ½ of the stroke length.

* * * * *